United States Patent
Park et al.

(10) Patent No.: US 12,125,643 B2
(45) Date of Patent: Oct. 22, 2024

(54) MULTILAYER ELECTRONIC COMPONENT

(71) Applicant: SAMSUNG ELECTRO-MECHANICS CO., LTD., Suwon-si (KR)

(72) Inventors: Jeong Bong Park, Suwon-si (KR); Da Jeong Han, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 347 days.

(21) Appl. No.: 17/716,208

(22) Filed: Apr. 8, 2022

(65) Prior Publication Data

US 2023/0178301 A1 Jun. 8, 2023

(30) Foreign Application Priority Data

Dec. 8, 2021 (KR) .................. 10-2021-0174656

(51) Int. Cl.
| | |
|---|---|
| *H01G 4/30* | (2006.01) |
| *H01G 2/06* | (2006.01) |
| *H01G 4/012* | (2006.01) |
| *H01G 4/12* | (2006.01) |
| *H01G 4/232* | (2006.01) |

(52) U.S. Cl.
CPC ............... *H01G 4/30* (2013.01); *H01G 2/065* (2013.01); *H01G 4/012* (2013.01); *H01G 4/12* (2013.01); *H01G 4/232* (2013.01)

(58) Field of Classification Search
None
See application file for complete search history.

(56) References Cited

U.S. PATENT DOCUMENTS

| | | | |
|---|---|---|---|
| 9,343,236 B2 | 5/2016 | Kim et al. | |
| 9,633,790 B1 | 4/2017 | Kim | |
| 2015/0348711 A1* | 12/2015 | Kim | H05K 1/181 |
| | | | 361/301.4 |
| 2019/0172643 A1* | 6/2019 | Cha | H01G 4/012 |

(Continued)

FOREIGN PATENT DOCUMENTS

| | | | |
|---|---|---|---|
| JP | 04302118 A | * | 10/1992 |
| JP | 2012-253245 A | | 12/2012 |

(Continued)

OTHER PUBLICATIONS

Korean Office Action dated May 1, 2024 issued in Korean Patent Application No. 10-2021-0174656 (with English translation).

*Primary Examiner* — Eric W Thomas
(74) *Attorney, Agent, or Firm* — Morgan, Lewis & Bockius LLP (57) ABSTRACT

A multilayer electronic component includes a body including a plurality of dielectric layers, and a capacitance formation portion including first and second internal electrodes alternately disposed in a third direction with the dielectric layer interposed therebetween, the body including first and second surfaces opposing in a first direction, third and fourth surfaces connected to the first and second surfaces and opposing in a second direction, and fifth and sixth surfaces connected to the first to fourth surfaces and opposing in the third direction, external electrodes disposed on the body, and a dummy electrode disposed to penetrate through the capacitance formation portion in the third direction.

19 Claims, 9 Drawing Sheets

(56) References Cited

U.S. PATENT DOCUMENTS

| | | | | |
|---|---|---|---|---|
| 2020/0027658 A1* | 1/2020 | Lee | ........................ | H01G 4/012 |
| 2020/0066450 A1* | 2/2020 | Uenishi | ................... | H01G 4/012 |
| 2021/0065977 A1* | 3/2021 | Kim | ....................... | H01G 4/012 |
| 2022/0139627 A1* | 5/2022 | Kim | ..................... | H01G 4/2325 |
| | | | | 361/301.4 |

FOREIGN PATENT DOCUMENTS

| | | | |
|---|---|---|---|
| KR | 10-2015-0136819 A | | 12/2015 |
| KR | 10-2017-0072021 A | | 6/2017 |
| KR | 10-2017-0110467 A | | 10/2017 |

* cited by examiner

MULTILAYER ELECTRONIC COMPONENT

CROSS-REFERENCE TO RELATED APPLICATION

This application claims the benefit under 35 USC 119 (a) of Korean Patent Application No. 10-2021-0174656 filed on Dec. 8, 2021 in the Korean Intellectual Property Office, the entire disclosure of which is incorporated herein by reference for all purposes.

BACKGROUND

1. Field

The present disclosure relates to a multilayer electronic component.

2. Description of Related Art

A Multilayer Ceramic Capacitor (MLCC), a multilayer electronic component, is a chip-type capacitor mounted on printed circuit boards of various electronic products, for example, imaging devices such as liquid crystal displays (LCDs) and plasma display panels (PDPs), computers, smartphones, and cell phones, to charge and discharge electricity.

Such multilayer ceramic capacitors may be used as components of various electronic devices due to small size, high capacitance, and ease thereof in mounting. Recently, as various electronic devices such as computers and mobile devices have been miniaturized and implemented with high output, the demand for miniaturization and high capacity of multilayer ceramic capacitors has also been increasing.

In addition, as industry interest in automotive electronic components has recently increased, multilayer ceramic capacitors are also required to have high reliability and high strength characteristics to be used in automobiles or infotainment systems.

In the multilayer ceramic capacitor, when equivalent series inductance (hereinafter, "ESL") increases, performance of the electronic device may deteriorate. Therefore, demand for a so-called "Low Inductance Chip Capacitor (LICC)", which is an MLCC of a vertically stacked three-terminal structure, in which the current loop formed inside the MLCC is significantly reduced by disposing the internal electrodes to be perpendicular to the surface of the substrate on which they are mounted, and ESL is reduced by increasing the number of current loops, is increasing.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

An aspect of the present disclosure is to provide a multilayer electronic component having reduced ESL.

An aspect of the present disclosure is to provide a multilayer electronic component having enhanced flexural strength.

According to an aspect of the present disclosure, a multilayer electronic component includes a body including a plurality of dielectric layers, and a capacitance formation portion including a first internal electrode and a second internal electrode alternately disposed in a third direction with the dielectric layer interposed therebetween, the body including a first surface and a second surface opposing each other in a first direction, a third surface and a fourth surface connected to the first and second surfaces and opposing each other in a second direction, and a fifth surface and a sixth surface connected to the first to fourth surfaces and opposing each other in the third direction; a 1-1 external electrode and a 1-2 external electrode disposed on the first surface, connected to the first internal electrode, and spaced apart from each other in the second direction; a 2-1 external electrode disposed on the first surface, connected to the second internal electrode, and disposed between the 1-1 external electrode and the 1-2 external electrode; and a dummy electrode disposed to penetrate through the capacitance formation portion in the third direction. The first internal electrode includes a first main portion, a 1-1 lead portion connecting the first main portion to the 1-1 external electrode, and a 1-2 lead portion connecting the first main portion to the 1-2 external electrode, the second internal electrode includes a second main portion, and a 2-1 lead portion connecting the second main portion to the 2-1 external electrode, and the dummy electrode includes a 1-1 dummy electrode disposed to penetrate between the 1-1 lead portion and the 2-1 lead portion in the third direction, and a 1-2 dummy electrode disposed to penetrate between the 1-2 lead portion and the 2-1 lead portion in the third direction.

According to another aspect of the present disclosure, a multilayer electronic component includes a body including a plurality of dielectric layers, and a capacitance formation portion including a first internal electrode and a second internal electrode alternately disposed in a third direction with the dielectric layer interposed therebetween; a first external electrode connected to the first internal electrode and disposed on a first surface of the body; and a second external electrode, which is a 2-1 external electrode, connected to the second internal electrode and disposed to be spaced apart from the first external electrode on the first surface. The first internal electrode includes a first main portion, and a first lead portion protruding from the first main portion to connect first main portion to the first external electrode, the second internal electrode includes a second main portion, and a second lead portion, which is a 2-1 lead portion, protruding from the second main portion to connect second main portion to the 2-1 external electrode, the body further includes a dummy electrode spaced apart from the first and second internal electrodes, and penetrating through the capacitance formation portion, and the dummy electrode continuously extends through the capacitance formation portion in a first direction in which the plurality of dielectric layers are stacked.

BRIEF DESCRIPTION OF DRAWINGS

The above and other aspects, features, and advantages of the present inventive concept will be more clearly understood from the following detailed description, taken in conjunction with the accompanying drawings, in which.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided and thus, this disclosure will be thorough and complete, and will fully convey the scope of the disclosure to one of ordinary skill in the art.

Herein, it is noted that use of the term "may" with respect to an embodiment or example, e.g., as to what an embodiment or example may include or implement, means that at least an embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other manners (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the detailed shapes illustrated in the drawings, but include changes in shape occurring during manufacturing.

The features of the examples described herein may be combined in various manners as will be apparent after gaining an understanding of the disclosure of this application. Further, although the examples described herein have a variety of configurations, other configurations are possible as will be apparent after gaining an understanding of the disclosure of this application.

The drawings may not be to scale, and the relative sizes, proportions, and depiction of elements in the drawings may be exaggerated for clarity, illustration, and convenience.

In the drawings, the third direction may be defined as a stacking direction or a width (W) direction, the second direction may be defined as a length (L) direction, and the first direction may be defined as a thickness (T) direction.

Multilayer Electronic Component

Figure 1:
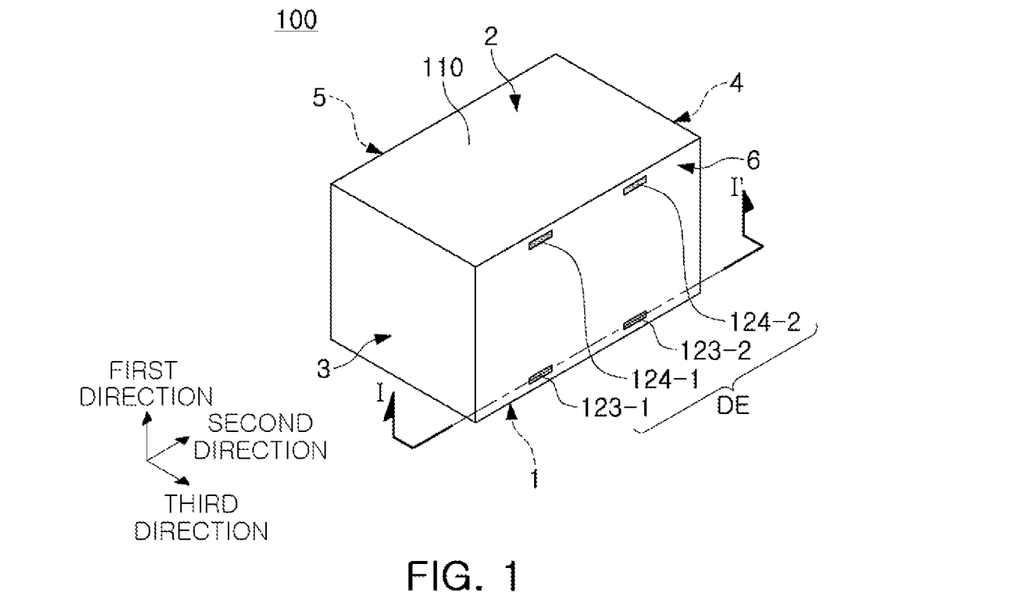
FIG. 1 schematically illustrates a perspective view of a multilayer electronic component according to an embodiment.
Figure 2:
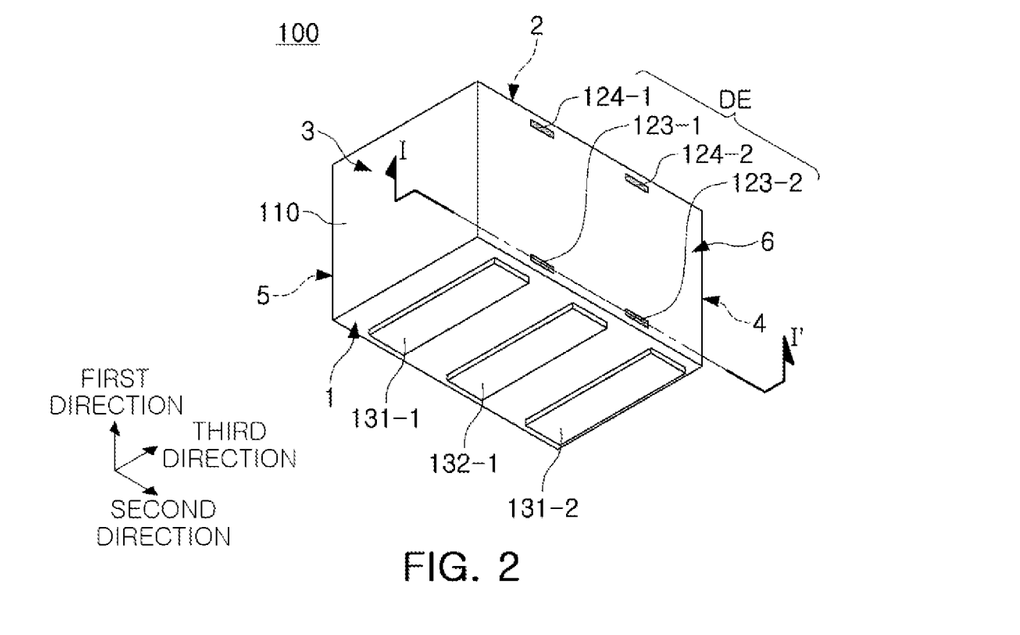
FIG. 2 schematically illustrates a perspective view of the multilayer electronic component of FIG. 1 viewed in another direction.
Figure 3:
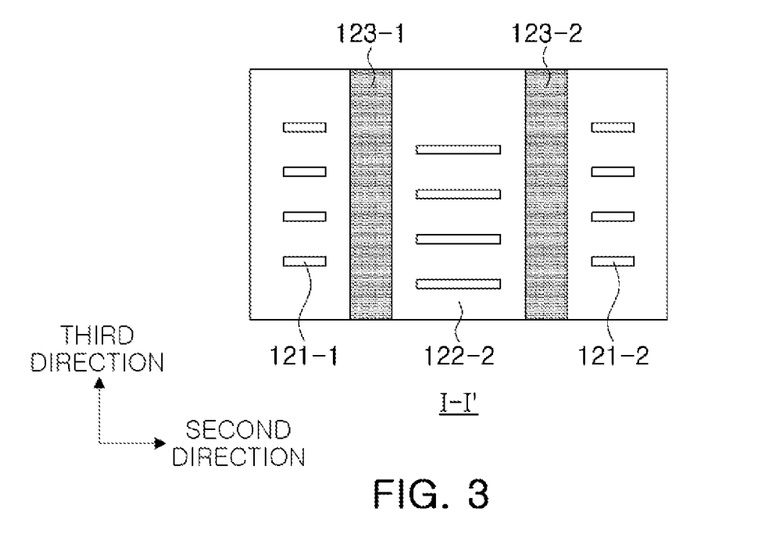
FIG. 3 is a cross-sectional view taken along line I-I' of FIG. 1.
Figure 4:
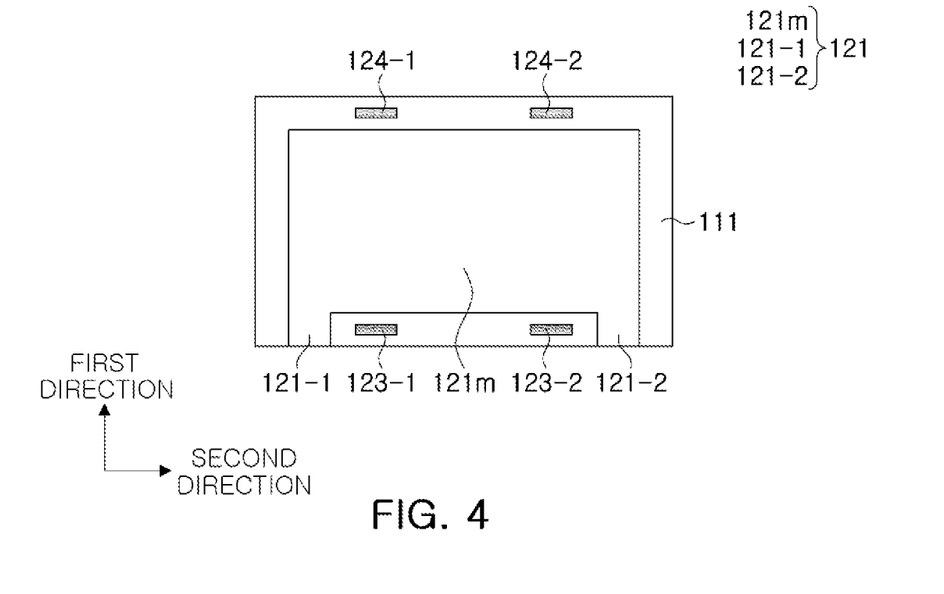
FIG. 4 illustrates a first internal electrode disposed on a dielectric layer included in a body of FIG. 1.
Figure 5:
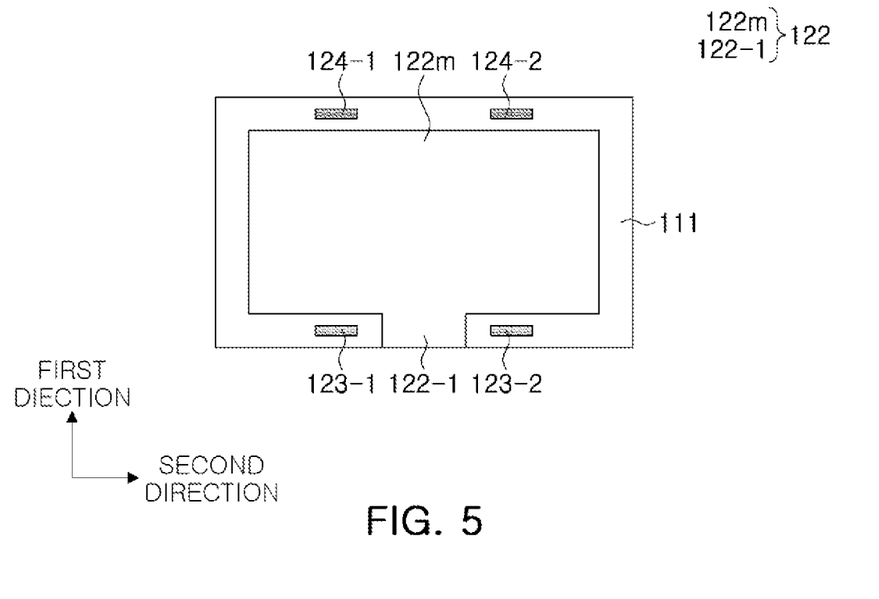
FIG. 5 illustrates a second internal electrode disposed on a dielectric layer included in the body of FIG. 1.
Figure 6:
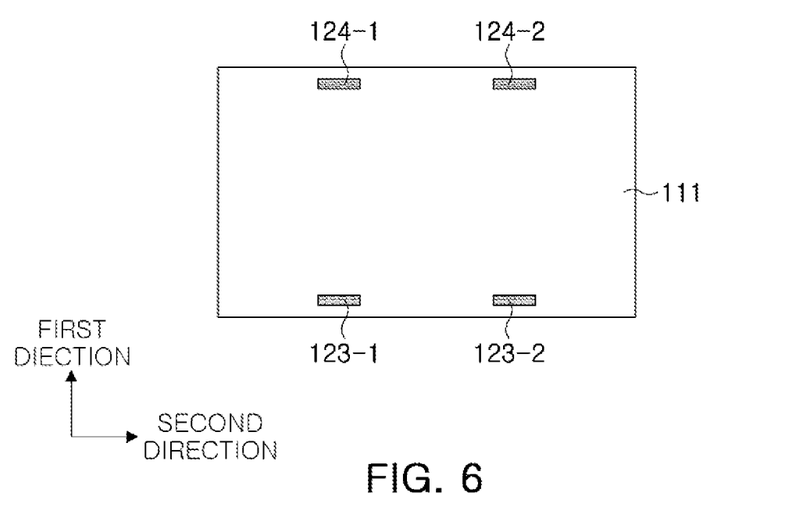
FIG. 6 illustrates a dielectric layer included in the body of FIG. 1.
Figure 7:
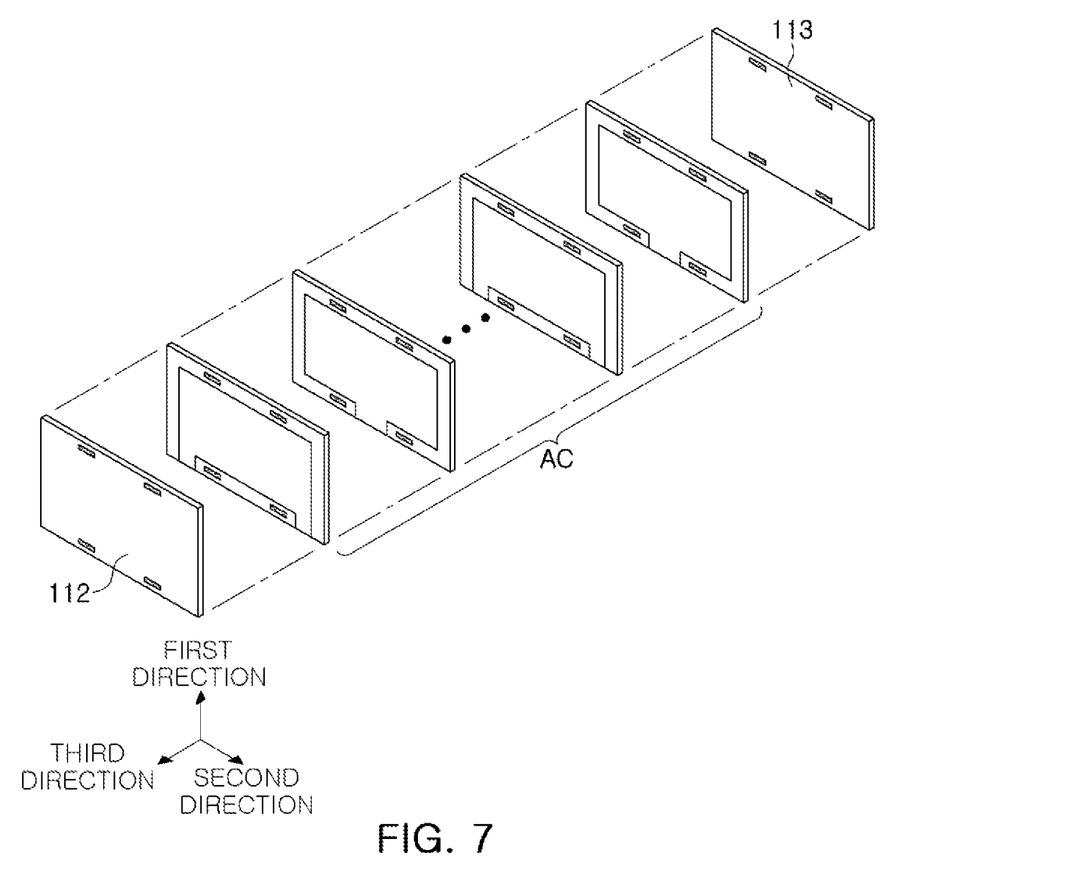
FIG. 7 is an exploded perspective view schematically illustrating an exploded body of FIG. 1.

FIG. 1 schematically illustrates a perspective view of a multilayer electronic component 100 according to an embodiment. FIG. 2 schematically illustrates a perspective view of the multilayer electronic component 100 of FIG. 1 viewed in another direction. FIG. 3 is a cross-sectional view taken along line I-I' of FIG. 1. FIG. 4 illustrates a first internal electrode disposed on a dielectric layer included in a body of FIG. 1. FIG. 5 illustrates a second internal electrode disposed on a dielectric layer included in the body of FIG. 1. FIG. 6 illustrates a dielectric layer included in the body of FIG. 1. FIG. 7 is an exploded perspective view schematically illustrating an exploded body of FIG. 1.

Hereinafter, the multilayer electronic component 100 according to an embodiment will be described in detail with reference to FIGS. 1 to 7.

The multilayer electronic component 100 according to an embodiment may include a body 110 including a plurality of dielectric layers 111, and first and second internal electrodes 121 and 122 alternately disposed in a third direction with the dielectric layers interposed therebetween, the body 110 including first and second surfaces 1 and 2 opposing each other in the first direction, third and fourth surfaces 3 and 4 connected to the first and second surfaces and opposing each other in the second direction, and fifth and sixth surfaces 5 and 6 connected to the first to fourth surfaces and opposing in the third direction; 1-1 and 1-2 external electrodes 131-1 and 131-2 disposed on the first surface, connected to the first internal electrode, and spaced apart from each other in the second direction; a 2-1 external electrode 132-1 disposed on the first surface, connected to the second internal electrode, and disposed between the 1-1 external electrode and the 1-2 external electrode; and a dummy electrode DE disposed to penetrate through a capacitance formation portion Ac in the third direction. In other words, according to one embodiment of the present disclosure, the dummy electrode DE may continuously extend through the capacitance formation portion Ac in the third direction. The first internal electrode 121 may include a first main portion 121m, a 1-1 lead portion 121-1 connecting the first main portion to the 1-1 external electrode, and a 1-2 lead portion 121-2 connecting the first main portion to the 1-2 external electrode. The second internal electrode 122 may include a second main portion 122m and a 2-1 lead portion 122-1 connecting the second main portion to the 2-1 external electrode. The dummy electrode may include a 1-1 dummy electrode 123-1 disposed to pass between the 1-1 lead portion and the 2-1 lead portion in the third direction, and a 1-2 dummy electrode 123-2 disposed to penetrate between the 1-2 lead portion and the 2-1 lead portion in the third direction.

According to an embodiment, as the 1-1, 1-2, and 2-1 external electrodes 131-1, 131-2, and 132-1 are disposed on the first surface, the first surface of the multilayer electronic component 100 may be a mounting surface. In addition, the 1-1 and 1-2 external electrodes 131-1 and 131-2 are connected to the first internal electrode 121, and the 2-1 external electrode 132-1 is connected to the second internal electrode 122 and is disposed between the 1-1 and 1-2 external electrodes 131-1 and 131-2. Therefore, a current loop may be significantly reduced and ESL may be reduced by increasing the number of current loops. In addition, since the first and second internal electrodes 121 and 122 are disposed to be perpendicular to the first surface, which is a mounting surface, a current loop may be made smaller.

In addition, since the dummy electrode DE disposed to penetrate through the capacitance formation portion Ac in the third direction is included, the electrode filling rate inside the body 110 may be improved, and thus, the flexural strength may be strengthened, and occurrence of cracks and delamination may be suppressed.

Hereinafter, each component of the multilayer electronic component 100 will be described in detail.

In the body 110, the dielectric layer 111 and the internal electrodes 121 and 122 may be alternately stacked.

Although the detailed shape of the body 110 is not particularly limited, as illustrated, the body 110 may have a hexahedral shape or a shape similar thereto. Due to the shrinkage of the ceramic powder particles included in the body 110 during the firing process, the body 110 may not have a perfectly straight hexahedral shape, but may have a substantially hexahedral shape.

The body 110 may have the first and second surfaces 1 and 2 opposing each other in the first direction, the third and fourth surfaces 3 and 4 connected to the first and second surfaces 1 and 2 and opposing each other in the second direction, and the fifth and sixth surfaces 5 and 6 connected to the first and second surfaces 1 and 2, connected to the third and fourth surfaces 3 and 4, and opposing each other in the third direction.

The mounting surface of the multilayer electronic component 100 may be the first surface 1 or the second surface 2 of the body 110.

The plurality of dielectric layers 111 forming the body 110 are in a fired state, and the boundary between the adjacent dielectric layers 111 may be integrated to the extent that it is difficult to determine without using a scanning electron microscope (SEM).

According to an embodiment, the raw material for forming the dielectric layer 111 is not particularly limited as long as sufficient capacitance may be obtained. For example, a barium titanate-based material, a lead composite perovskite-based material, or a strontium titanate-based material may be used. The barium titanate-based material may include $BaTiO_3$-based ceramic powder, and the examples of the ceramic powder may include $BaTiO_3$, $(Ba_{1-x}Ca_x)TiO_3$ $(0<x<1)$, $Ba(Ti_{1-y}Ca_y)O_3$ $(0<y<1)$, $(Ba_{1-x}Ca_x)(Ti_{1-y}Zr_y)O_3$ $(0<x<1, 0<y<1)$ or $Ba(Ti_{1-y}Zr_y)O_3$ $(0<y<1)$, in which Ca (calcium), Zr (zirconium) or the like is partially solid-solubilized in $BaTiO_3$, or the like.

In addition, various ceramic additives, organic solvents, binders, dispersants, or the like may be added to powder such as barium titanate ($BaTiO_3$) as a raw material for forming the dielectric layer 111 according to the use of the present disclosure.

The body 110 may include the capacitance formation portion Ac disposed inside the body 110 and including the first internal electrode 121 and the second internal electrode 122 disposed to face each other with the dielectric layer 111 interposed therebetween, to form capacitance therein, and cover portions 112 and 113 formed on both end surfaces of the capacitance formation portion Ac in the third direction.

In addition, the capacitance formation portion Ac is a part contributing to capacitance formation of the capacitor, and may be formed by repeatedly stacking the plurality of first and second internal electrodes 121 and 122 in the third direction with the dielectric layer 111 interposed therebetween.

The cover portions 112 and 113 may include a first cover portion 112 disposed on one surface of the capacitance formation portion Ac in the third direction, and a second cover portion 113 disposed on the other surface of the capacitance formation portion Ac in the third direction.

The first cover portion 112 and the second cover portion 113 may be formed by stacking a single dielectric layer or two or more dielectric layers on both end surfaces of the capacitance formation portion Ac in the third direction, respectively, in the third direction, and may basically serve to prevent damage to the internal electrode due to physical or chemical stress.

The cover portions 112 and 113 do not include internal electrodes, but may include the dummy electrode DE penetrating through the cover portions 112 and 113.

The cover portions 112 and 113 may include the same material as that of the dielectric layer 111. For example, the first cover portion 112 and the second cover portion 113 may include a ceramic material, for example, a barium titanate ($BaTiO_3$)-based ceramic material.

The internal electrodes 121 and 122 may be stacked alternately with the dielectric layer 111.

The internal electrodes 121 and 122 may include first and second internal electrodes 121 and 122. The first and second internal electrodes 121 and 122 may be alternately disposed to face each other, with the dielectric layer 111 constituting the body 110, interposed therebetween.

The first internal electrode 121 may include the first main portion 121m, the 1-1 lead portion 121-1 connecting the first main portion 121m to the 1-1 external electrode 131-1, and the 1-2 lead portion 122-2 connecting the first main portion 121m to the 1-2 external electrode 131-2. The 1-1 lead portion 121-1 and the 1-2 lead portion 121-2 are exposed to the first surface 1 of the body 110 to electrically connect the first internal electrode 121 and the 1-1 and 1-2 external electrodes 131-1 and 131-2.

The second internal electrode 122 may include the second main portion 122m, and the 2-1 lead portion 122-1 connecting the second main portion 122m to the 2-1 external electrode 132-1. The 2-1 lead portion 122-1 may be exposed to the first surface 1 of the body 110 to electrically connect the second internal electrode 122 and the 2-1 external electrode 132-1.

The first and second main portions 121m and 122m may overlap each other in the third direction to form a capacitance. The first and second main portions 121m and 122m may be disposed to be spaced apart from the first to sixth surfaces 1 to 6.

The first and second internal electrodes 121 and 122 may be electrically isolated from each other by the dielectric layer 111 disposed therebetween.

The body 110 may be formed by alternately stacking a ceramic green sheet on which the first internal electrode 121 is printed and a ceramic green sheet on which the second internal electrode 122 is printed, in the third direction, and then firing the same.

The material for forming the internal electrodes 121 and 122 is not particularly limited, and a material having excellent electrical conductivity may be used. For example, the internal electrodes 121 and 122 may include at least one of nickel (Ni), copper (Cu), palladium (Pd), silver (Ag), gold (Au), platinum (Pt), tin (Sn), tungsten (W), titanium (Ti), and alloys thereof.

In addition, the internal electrodes 121 and 122 may be formed by printing a conductive paste for internal electrodes, including at least one of nickel (Ni), copper (Cu), palladium (Pd), silver (Ag), gold (Au), platinum (Pt), tin (Sn), tungsten (W), titanium (Ti) and alloys thereof on a ceramic green sheet. The printing method of the conductive paste for internal electrodes may use a screen-printing method or a gravure printing method, but the present disclosure is not limited thereto.

The dummy electrode DE may be disposed to penetrate through the capacitance formation portion Ac in the third direction.

A method of disposing the dummy pattern on the same plane as the internal electrode may be considered to strengthen the flexural strength. However, to dispose the dummy pattern so as not to be electrically connected to the internal electrode and the external electrode, there is a space constraint and thus, there is a limit in increasing the electrode filling rate of the body 110.

Meanwhile, according to an embodiment of the present disclosure, since the dummy electrode DE is disposed to penetrate through the capacitance formation portion Ac in the third direction, which is the stacking direction, the dummy electrode may be disposed on the same plane as the dielectric layer 111 as well as the internal electrodes 121 and 122. The electrode filling rate of the body 110 may be further improved, and thus the flexural strength may be further improved. As illustrated in FIGS. 3 and 4, the dummy electrode DE may be not only disposed on the same plane as the internal electrodes 121 and 122, but also on the same plane as the dielectric layer 111 as illustrated in FIG. 5. Furthermore, the dummy electrode DE is disposed to penetrate through the capacitance formation portion Ac in the third direction, which is the stacking direction of the dielectric layer 111, and may thus serve as improving the bonding force between the dielectric layers 111 on which the dummy electrode DE is stacked, thereby preventing delamination.

Since the dummy electrode DE is disposed to be spaced apart from the first and second internal electrodes 121 and 122, the dummy electrode DE may not participate in capacitance formation. Also, the dummy electrode DE is disposed to be spaced apart from the first surface 1, and thus, may also be electrically insulated from the external electrode disposed on the first surface 1.

Referring to FIG. 3, the dummy electrode DE may include the 1-1 dummy electrode 123-1 disposed to penetrate through the 1-1 lead portion 121-1 and the 2-1 lead portion 122-1 in the third direction, and the 1-2 dummy electrode 123-2 disposed to penetrate through the 1-2 lead portion 121-2 and the 2-1 lead portion 122-1 in the third direction.

On the other hand, the shape of the dummy electrode DE is not particularly limited, and the detailed shape of the dummy electrode may be determined in consideration of required flexural strength characteristics, shapes of the internal electrodes 121 and 122, or the like.

In addition, the number of dummy electrodes DE is not particularly limited, and the number of dummy electrodes may be determined in consideration of required flexural strength characteristics or the shape of the internal electrode. For example, the 1-1 dummy electrodes 123-1 and the 1-2 dummy electrodes 123-2 may be respectively provided as a plurality of dummy electrodes. Accordingly, the metal filling rate inside the body 110 may be further improved, and thus, the flexural strength may be further improved.

In an embodiment, the dummy electrodes DE may further include second dummy electrodes 124-1 and 124-2 disposed to penetrate, in the third direction, through a region in which the first and second internal electrodes 121 and 122 are spaced apart from the second surface 2. By disposing the second dummy electrodes 124-1 and 124-2, the metal filling rate inside the body 110 may be further improved, and thus, the effect of improving the flexural strength and suppressing the delamination according to the present disclosure may be further improved.

In this case, the second dummy electrodes 124-1 and 124-2 may be provided as a plurality of dummy electrodes. The region in which the first and second internal electrodes 121 and 122 and the second surface 2 are spaced apart is wider than a region between the 1-1 lead portion 121-1 and the 2-1 lead portion 122-1 and a region between the 1-2 lead portion 121-2 and the 2-1 lead portion 122-1, a relatively larger number of the second dummy electrodes 124-1 and 124-2 may be disposed.

A material for forming the dummy electrode DE is not particularly limited, and a material having superior strength characteristics than that of the dielectric layer 111 may be used. For example, a metal material having superior strength characteristics than the ceramic material constituting the dielectric layer 111 may be used. Like the internal electrode, the dummy electrode DE may include at least one of nickel (Ni), copper (Cu), palladium (Pd), silver (Ag), gold (Au), platinum (Pt), tin (Sn), tungsten (W), titanium (Ti), and alloys thereof. However, it is not necessary to limit the material to the same material as that of the internal electrode, and the dummy electrode may be formed of a material different from that of the internal electrode.

The method of forming the dummy electrode DE is not particularly limited. For example, a hole is drilled using a laser drill, a mechanical pin puncher, or the like in a position of the ceramic green sheet in which the dummy electrode is to be formed, and a conductive paste is printed in the hole when printing the first and second internal electrodes, thereby forming the dummy electrode. In this case, the dummy electrode may not be formed on the ceramic green sheet for formation of the cover portion, and accordingly, the dummy electrode may not be disposed on the cover portions 112 and 113. Of course, a hole may be punched in the ceramic green sheet for forming the cover portion and the dummy electrode may be printed in the hole, and thus, the dummy electrode may also be formed to penetrate not only the capacitance formation portion but also the cover portion, to penetrate through the entire body in the third direction. Accordingly, the dummy electrode DE may be disposed to penetrate through the body 110 in the third direction.

As another example, a laminate is formed by laminating the ceramic green sheets, and after forming a via in a body provided by cutting the laminate into a unit chip size, using a laser drill, a mechanical pin puncher or the like, the via is filled with a conductive material, thereby forming the electrode. Accordingly, the dummy electrode DE may be disposed to penetrate through the body 110 in the third direction.

Figure 8:
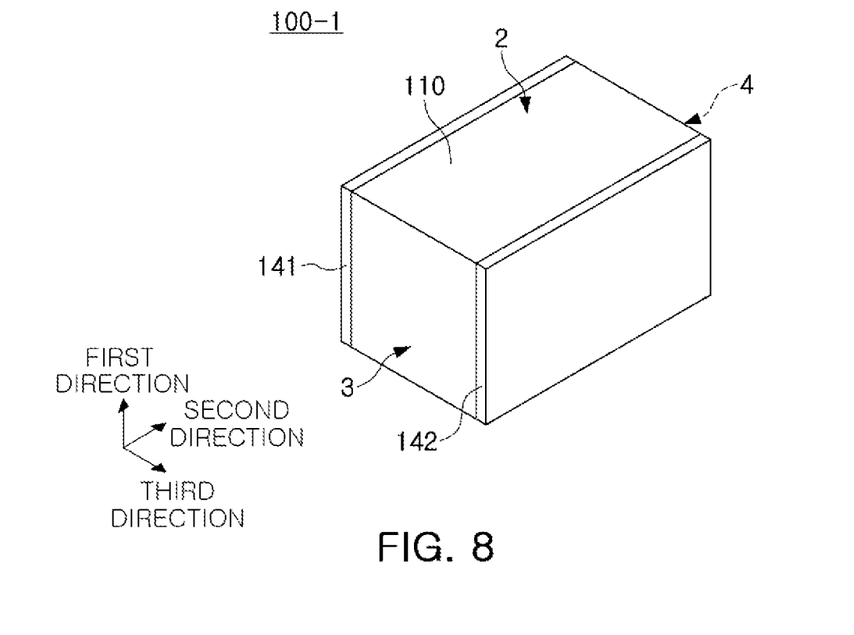
FIG. 8 illustrates a modified example of FIG. 1.

On the other hand, when the dummy electrode DE is disposed to penetrate through the body 110 in the third direction, as illustrated in FIG. 8, a multilayer electronic component 100-1 may include insulating layers 141 and 142 disposed on the fifth and sixth surfaces 5 and 6 of the body 110. In the case in which the dummy electrode DE is exposed to the fifth and sixth surfaces 5 and 6 of the body 110, since a moisture penetration path through moisture, a plating solution or the like may penetrate into the body 110 may be formed, the insulating layers 141 and 142 may be disposed to ensure reliability.

The external electrodes 131-1, 131-2, and 132-1 may be disposed on the first surface 1 of the body 110.

The external electrodes 131-1, 131-2 and 132-1 may include the 1-1 external electrode 131-1 and the 1-2 external electrode 131-2 connected to the first internal electrode 121, and the 2-1 external electrode 132-1 connected to the second internal electrode. The 1-1 external electrode 131-1, the 1-2 external electrode 131-2, and the 2-1 external electrode 132-1 may be disposed on the first surface 1 of the body 110.

The 1-1 external electrode 131-1 and the 1-2 external electrode 131-2 are disposed to be spaced apart from each other in the second direction, and the 2-1 external electrode 132-1 may be disposed between the 1-1 external electrode 131-1 and the 1-2 external electrode 131-2. Accordingly, ESL may be reduced by significantly reducing a current loop.

On the other hand, as the material of the external electrodes 131-1, 131-2, and 132-1, any material may be used as long as it has electrical conductivity such as a metal or the like, and a detailed material may be determined in consideration of electrical characteristics and structural stability. In addition, the external electrode may have a multi-layered structure.

For example, the external electrodes 131-1, 131-2, and 132-1 may include an electrode layer disposed on the body 110 and a plating layer formed on the electrode layer.

As a more detailed example of the electrode layer, the electrode layer may be a fired electrode including a conductive metal and glass or may be a resin-based electrode including a conductive metal and a resin. In addition, the electrode layer may have a form in which a fired electrode and a resin-based electrode are sequentially formed on the body 110. In addition, the electrode layer may be formed by transferring a sheet including a conductive metal onto the body 110 or by transferring a sheet including a conductive metal onto the fired electrode.

As the conductive metal included in the electrode layer, a material having excellent electrical conductivity may be used, and there is no particular limitation. For example, the conductive metal may be one or more of nickel (Ni), copper (Cu), and alloys thereof.

The plating layer formed on the electrode layer serves to improve mounting characteristics. The type of the plating layer is not particularly limited, and may be a plating layer including at least one of Ni, Sn, Pd, and alloys thereof, and may be formed of a plurality of layers.

On the other hand, although FIGS. 1 to 8 illustrate a case in which the external electrodes are disposed on the first surface 1 of the body 110, the present disclosure is not limited thereto, and according to another embodiment, the external electrodes may be disposed on the second surface 2.

Hereinafter, a multilayer electronic component 100-2 according to another embodiment will be described in detail with reference to FIGS. 9 to 14. However, to avoid overlapping description, the content overlapping with the above-described content will be omitted.

Figure 9:
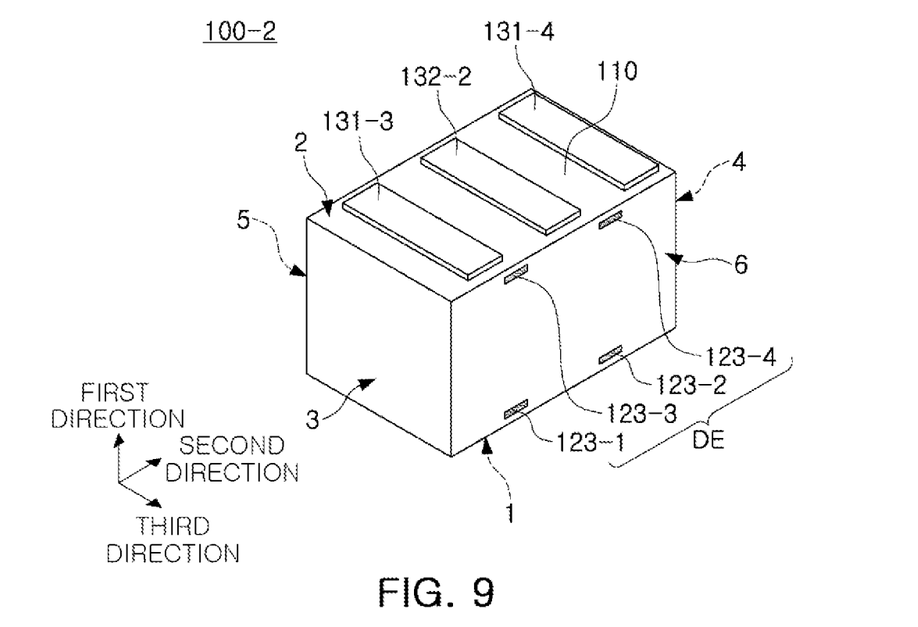
FIG. 9 is a schematic perspective view of a multilayer electronic component according to another embodiment.

FIG. 9 is a schematic perspective view of the multilayer electronic component 100-2 according to another embodiment.

Figure 10:
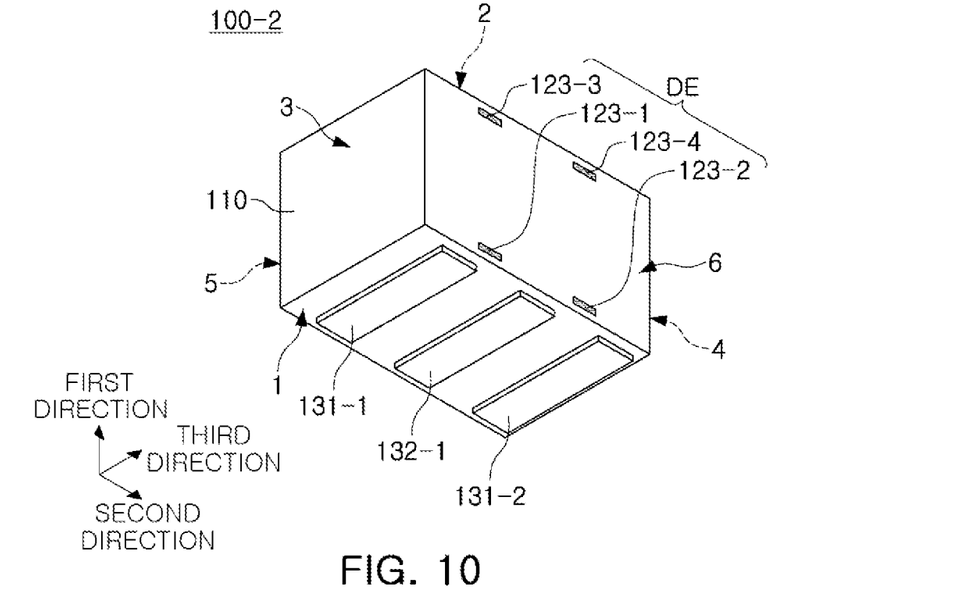
FIG. 10 schematically illustrates a perspective view of the multilayer electronic component of FIG. 9 when viewed in another direction.
Figure 11:
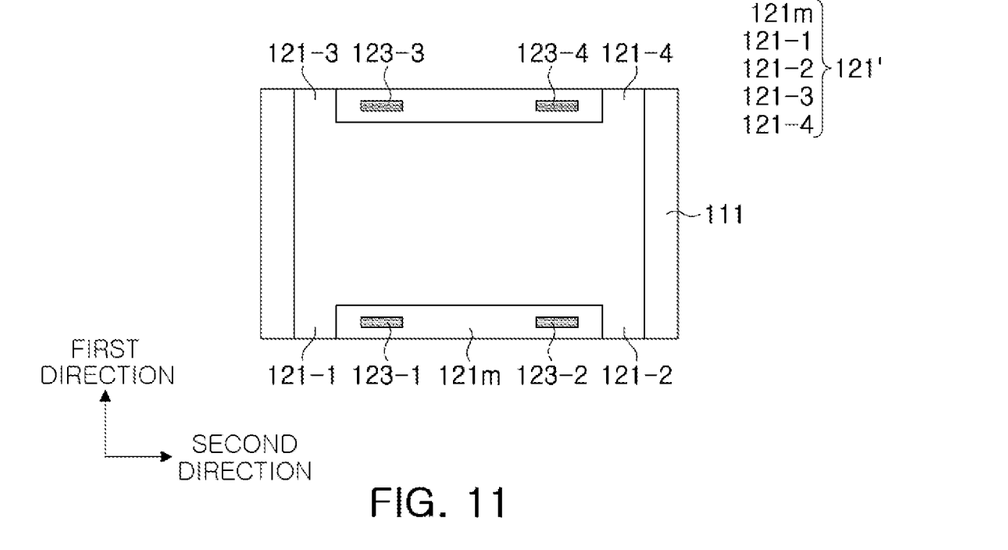
FIG. 11 illustrates a first internal electrode disposed on a dielectric layer included in a body of FIG. 9.
Figure 12:
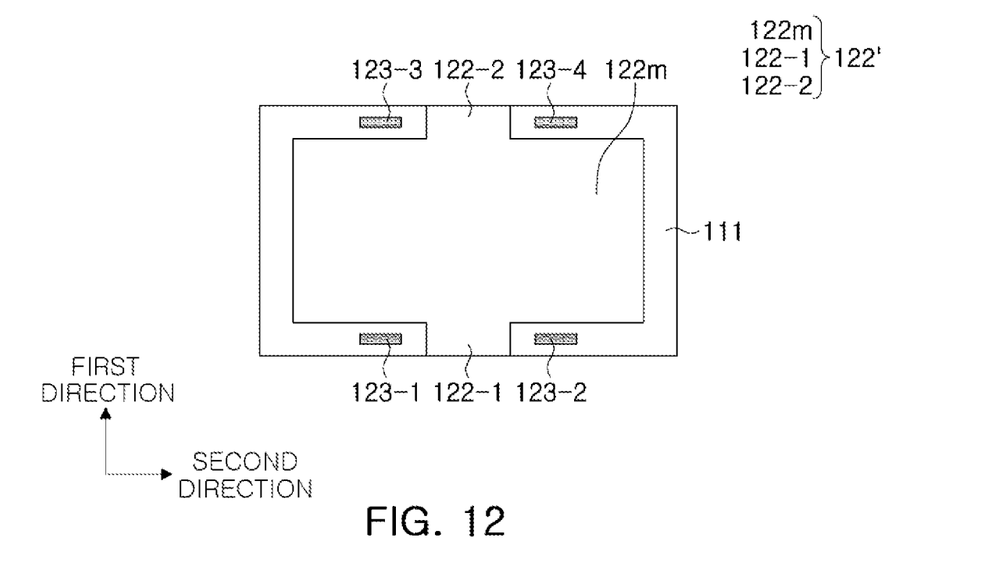
FIG. 12 illustrates a second internal electrode disposed on a dielectric layer included in the body of FIG. 9.
Figure 13:
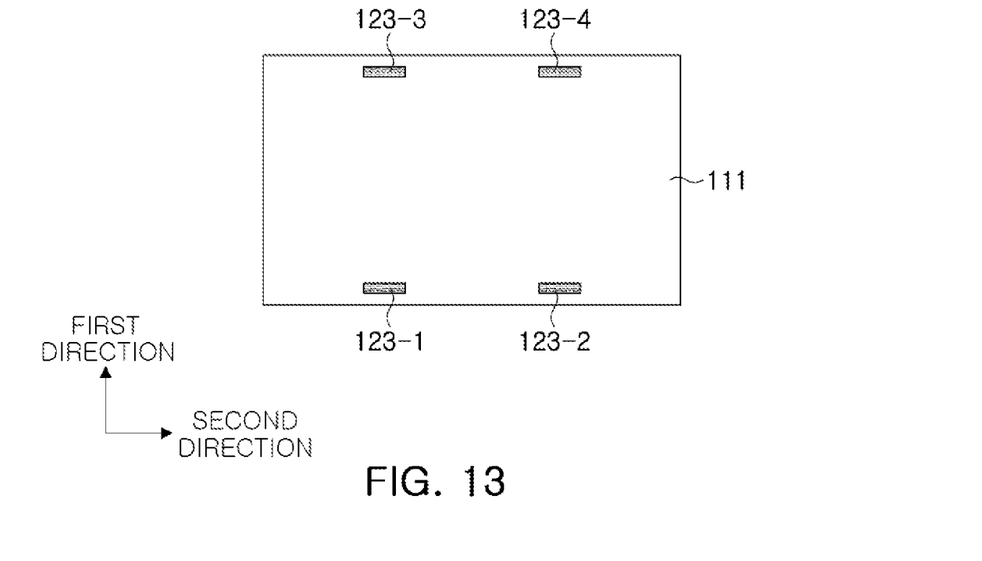
FIG. 13 illustrates a dielectric layer included in the body of FIG. 9.
Figure 14:
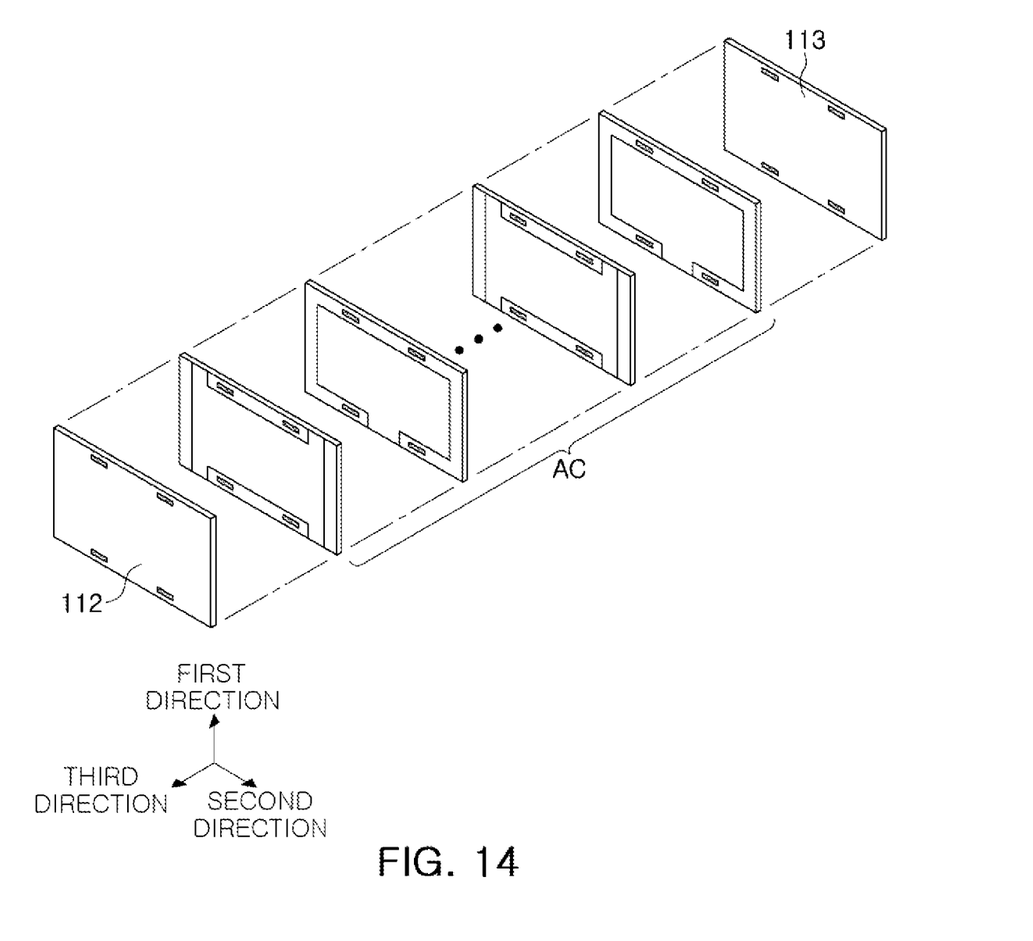
FIG. 14 is an exploded perspective view schematically illustrating an exploded body of FIG. 9.

FIG. 10 schematically illustrates a perspective view of the multilayer electronic component 100-2 of FIG. 9 when viewed in another direction. FIG. 11 illustrates a first internal electrode disposed on a dielectric layer included in a body of FIG. 9. FIG. 12 illustrates a second internal electrode disposed on a dielectric layer included in the body of FIG. 9. FIG. 13 illustrates a dielectric layer included in the body of FIG. 9. FIG. 14 is an exploded perspective view schematically illustrating an exploded body of FIG. 9.

Referring to FIGS. 9 and 10, 1-1, 1-2, and 2-1 external electrodes 131-1, 131-2, and 132-1 may be disposed on the first surface 1 of the body 110, 1-3, 1-4, and 2-2 external electrodes 131-3, 131-4, and 132-2 may be disposed on the second surface 2 of the body 110. As the external electrodes 131-3, 131-4, and 132-2 are also disposed on the second surface 2 of the body 110, the first surface 1 or the second surface 2 may be used as a mounting surface, thereby improving mounting freedom.

As the 1-3, 1-4, and 2-2 external electrodes 131-3, 131-4, and 132-2 are disposed on the second surface 2 of the body 110, the first internal electrode 121 may further include a 1-3 lead portion 121-3 connecting the first main portion 121m to the 1-3 external electrode 131-3, and a 1-4 lead portion 121-4 connecting the first main portion 121m to the 1-4 external electrode 131-4, and the second internal electrode 122 may further include a 2-2 lead portion 122-2 connecting the second main portion 122m to the 2-2 external electrode 132-2.

In addition, the dummy electrode DE may further include a 1-3 dummy electrode 123-3 disposed to penetrate between the 1-3 lead portion 121-3 and the 2-2 lead portion 122-2 in the third direction, and a 1-4 dummy electrode 123-4 disposed to penetrate between the 1-4 lead portion 121-4 and the 2-2 lead portion 122-2 in the third direction.

By disposing the 1-3 and 1-4 dummy electrodes 123-3 and 123-4, the metal filling rate inside the body 110 may be further improved to further improve the effect of improving the flexural strength and suppressing the delamination according to an embodiment of the present disclosure.

In this case, the 1-3 and 1-4 dummy electrodes 123-3 and 123-4 may be respectively provided as a plurality of dummy electrodes. Accordingly, the metal filling rate inside the body 110 may be further improved, and thus, the effect of improving the flexural strength and the effect of suppressing delamination may be further improved.

Figure 15:
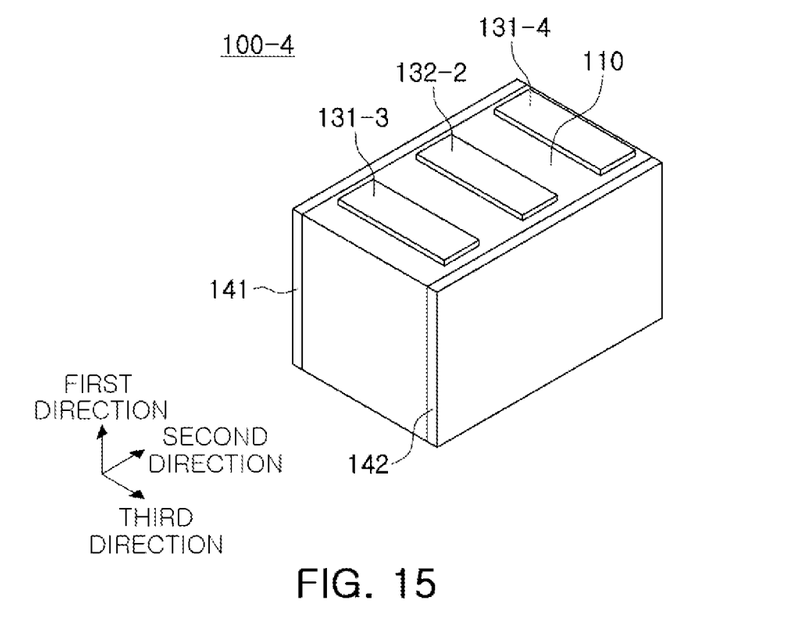
FIG. 15 illustrates a modified example of FIG. 9.

On the other hand, when the dummy electrode DE is disposed to penetrate through the body 110 in the third direction, as illustrated in FIG. 15, a multilayer electronic component 100-4 may include insulating layers 141 and 142 disposed on the fifth and sixth surfaces 5 and 6 of the body 110. When the dummy electrode DE is exposed to the fifth and sixth surfaces 5 and 6 of the body 110, since a moisture penetration path through which moisture, a plating solution, or the like may penetrate into the body 110 may be formed, the insulating layers 141 and 142 is disposed, thereby improving reliability.

EXAMPLE

Table 1 below illustrates the evaluation of the flexural strength characteristics of samples, in detail, in the state in which external electrodes are disposed on the first and second surfaces as illustrated in FIGS. 9 and 10, the evaluations of a sample (Test No. 1) in which the dummy electrode DE is not disposed, a sample (Test No. 2) in which the 1-1 and 1-2 dummy electrodes 123-1 and 123-2 are disposed, and a sample (Test No. 3) in which the 1-1, 1-2, 1-3, and 1-4 dummy electrodes 123-1, 123-2, 123-3, and 123-4 are disposed.

Figure 16:
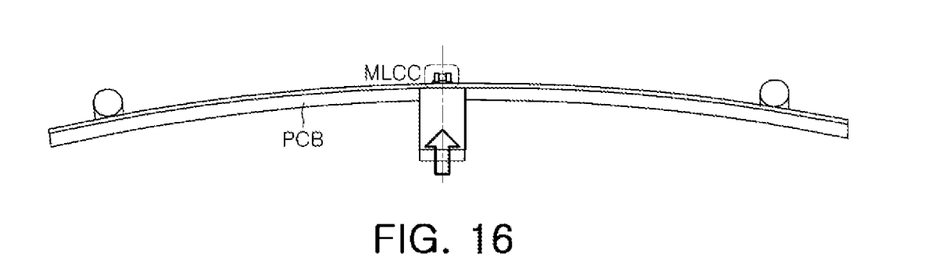
FIG. 16 is a view illustrating a flexural strength test.

Referring to FIG. 16, with respect to the flexural strength characteristics, after preparing 1000 sample chips for each test number, the sample chip (MLCC) is mounted on the printed circuit board (PCB), and after applying stress by pressing the surface opposite to the mounting surface of the sample chip (MLCC) mounting surface to 5 mm, the sample chip (MLCC) is observed with an optical microscope. It was determined to be defective when a crack or delamination occurred, and the number of defective samples among the total number of sample chips is described.

TABLE 1

| Test No. | 1-1 and 1-2 Dummy Electrodes | 1-3 and 1-4 Dummy Electrodes | Flexural strength Characteristics |
|---|---|---|---|
| 1 | X | X | 573/1000 |
| 2 | ○ | X | 228/1000 |
| 3 | ○ | ○ | 81/1000 |

In the case of Test Nos. 2 and 3 in which the 1-1 and 1-2 dummy electrodes were disposed, the defect rate was reduced to half or less, compared to Test No. 1 in which the dummy electrode was not disposed, and it could be confirmed that the flexural strength characteristics were significantly improved.

In addition, it can be seen that Test No. 3 in which the 1-3 and 1-4 dummy electrodes are additionally disposed has significantly improved flexural strength characteristics compared to Test No. 2.

Accordingly, it may be preferable that two or more dummy electrodes are disposed, and it may be more preferable that four or more dummy electrodes are disposed.

As set forth above, according to an embodiment, ESL may be reduced by significantly reducing a current loop formed inside the multilayer electronic component.

Flexural strength characteristics may be improved by disposing a dummy electrode penetrating through the capacitance formation portion.

While this disclosure includes detailed examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A multilayer electronic component comprising:
   a body including a plurality of dielectric layers, and a capacitance formation portion including a first internal electrode and a second internal electrode alternately disposed in a third direction with at least one of the dielectric layers interposed therebetween, the body including a first surface and a second surface opposing each other in a first direction, a third surface and a fourth surface connected to the first and second surfaces and opposing each other in a second direction, and a fifth surface and a sixth surface connected to the first to fourth surfaces and opposing each other in the third direction;
   a 1-1 external electrode and a 1-2 external electrode disposed on the first surface, connected to the first internal electrode, and spaced apart from each other in the second direction;
   a 2-1 external electrode disposed on the first surface, connected to the second internal electrode, and disposed between the 1-1 external electrode and the 1-2 external electrode; and
   a dummy electrode disposed to penetrate through the capacitance formation portion in the third direction,
   wherein the first internal electrode includes a first main portion, a 1-1 lead portion connecting the first main portion to the 1-1 external electrode, and a 1-2 lead portion connecting the first main portion to the 1-2 external electrode,
   the second internal electrode includes a second main portion, and a 2-1 lead portion connecting the second main portion to the 2-1 external electrode, and
   the dummy electrode includes a 1-1 dummy electrode disposed to extend between the 1-1 lead portion and the 2-1 lead portion in the third direction, and a 1-2 dummy electrode disposed to extend between the 1-2 lead portion and the 2-1 lead portion in the third direction.

2. The multilayer electronic component of claim 1, wherein the dummy electrode is disposed to be spaced apart from the first and second internal electrodes.

3. The multilayer electronic component of claim 1, wherein the dummy electrode is disposed to be spaced apart from the first surface.

4. The multilayer electronic component of claim 1, wherein the 1-1 dummy electrode and the 1-2 dummy electrode are each disposed in plural.

5. The multilayer electronic component of claim 1, wherein the dummy electrode further comprises a second dummy electrode disposed to penetrate, in the third direction, through a region in which the first and second internal electrodes and the second surface are spaced apart from each other.

6. The multilayer electronic component of claim 5, wherein the second dummy electrode is disposed in plural.

7. The multilayer electronic component of claim 1, wherein the dummy electrode is disposed in four or more.

8. The multilayer electronic component of claim 1, wherein the dummy electrode is disposed to penetrate through the body in the third direction.

9. The multilayer electronic component of claim 8, further comprising an insulating layer disposed on the fifth and sixth surfaces.

10. The multilayer electronic component of claim 1, further comprising:
a 1-3 external electrode and a 1-4 external electrode disposed on the second surface, connected to the first internal electrode, and spaced apart from each other in the second direction; and
a 2-2 external electrode disposed on the second surface, connected to the second internal electrode, and disposed between the 1-3 external electrode and the 1-4 external electrode,
wherein the first internal electrode further includes a 1-3 lead portion connecting the first main portion to the 1-3 external electrode, and a 1-4 lead portion connecting the first main portion to the 1-4 external electrode, and
the second internal electrode further includes a 2-2 lead portion connecting the second main portion to the 2-2 second external electrode.

11. The multilayer electronic component of claim 10, wherein the dummy electrode further comprises a 1-3 dummy electrode disposed to extend between the 1-3 lead portion and the 2-2 lead portion in the third direction, and a 1-4 dummy electrode disposed to extend between the 1-4 lead portion and the 2-2 lead portion in the third direction.

12. The multilayer electronic component of claim 11, wherein the 1-3 dummy electrode and the 1-4 dummy electrode are disposed in plural.

13. A multilayer electronic component comprising:
a body including a plurality of dielectric layers, and a capacitance formation portion including a first internal electrode and a second internal electrode alternately disposed in a first direction with at least one of the dielectric layers interposed therebetween;
a first external electrode connected to the first internal electrode and disposed on a first surface of the body; and
a second external electrode, which is a 2-1 external electrode, connected to the second internal electrode and disposed to be spaced apart from the first external electrode on the first surface,
wherein the first internal electrode includes a first main portion, and a first lead portion protruding from the first main portion to connect first main portion to the first external electrode,
the second internal electrode includes a second main portion, and a second lead portion, which is a 2-1 lead portion, protruding from the second main portion to connect second main portion to the 2-1 external electrode,
the body further includes a dummy electrode spaced apart from the first and second internal electrodes, and penetrating through the capacitance formation portion,
the dummy electrode continuously extends through the capacitance formation portion in the first direction in which the plurality of dielectric layers are stacked, and
the dummy electrode is disposed between the first lead portion and the second lead portion.

14. The multilayer electronic component of claim 13, wherein the first external electrode comprises a 1-1 external electrode and a 1-2 external electrode disposed to spaced apart from each other on the first surface, and
the first lead portion of the first internal electrode comprises a 1-1 lead portion connecting the first main portion to the 1-1 external electrode, and a 1-2 lead portion connecting the first main portion to the 1-2 external electrode.

15. The multilayer electronic component of claim 14, wherein the dummy electrode includes a 1-1 dummy electrode disposed to extend between the 1-1 lead portion and the 2-1 lead portion, and a 1-2 dummy electrode disposed to extend between the 1-2 lead portion and the 2-1 lead portion.

16. The multilayer electronic component of claim 15, wherein, in a cross-sectional view of the body perpendicular to the first direction, each of the 1-1 dummy electrode and the 1-2 dummy electrode is spaced apart from any portion of the first and second internal electrodes and outer edges of the body.

17. The multilayer electronic component of claim 15, further comprising:
a 1-3 external electrode and a 1-4 external electrode connected to the first internal electrode and disposed to be spaced apart from each other on a second surface of the body, the second surface being an opposite surface of the first surface; and
a 2-2 external electrode disposed on the second surface, connected to the second internal electrode, and disposed between the 1-3 external electrode and the 1-4 external electrode,
wherein the first internal electrode further includes a 1-3 lead portion connecting the first main portion to the 1-3 external electrode, and a 1-4 lead portion connecting the first main portion to the 1-4 external electrode, and
the second internal electrode further includes a 2-2 lead portion connecting the second main portion to the 2-2 external electrode.

18. The multilayer electronic component of claim 17, wherein the dummy electrode further comprises a 1-3 dummy electrode disposed to extend between the 1-3 lead portion and the 2-2 lead portion in the first direction, and a 1-4 dummy electrode disposed to extend between the 1-4 lead portion and the 2-2 lead portion in the first direction.

19. The multilayer electronic component of claim 13, wherein the dummy electrode further comprises a second dummy electrode disposed to penetrate, in the first direction, through a region in which the first and second internal electrodes and a second surface of the body are spaced apart from each other, the second surface being an opposite surface of the first surface.

* * * * *